June 13, 1961   D. CANVASSER   2,988,103
DEVICE FOR PREVENTING BACK SYPHONING IN WATER PIPES
Filed Sept. 30, 1957   2 Sheets-Sheet 1

INVENTOR.
DARWIN CANVASSER
BY
Gregory S. Dolgorukov
ATTORNEY

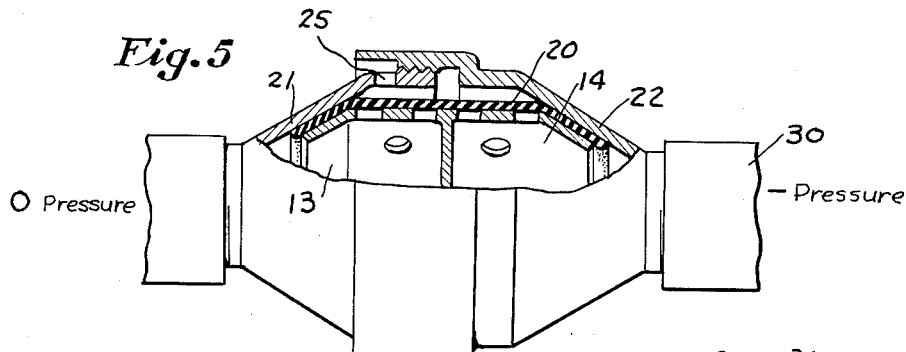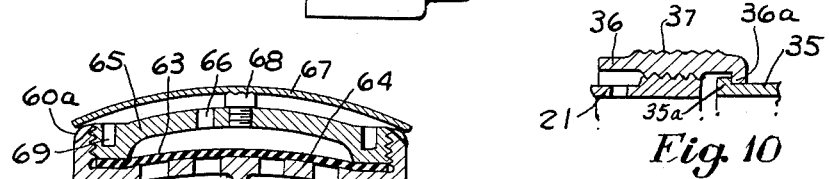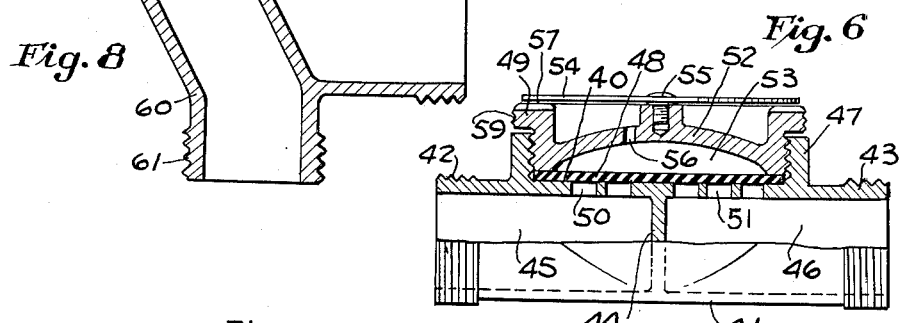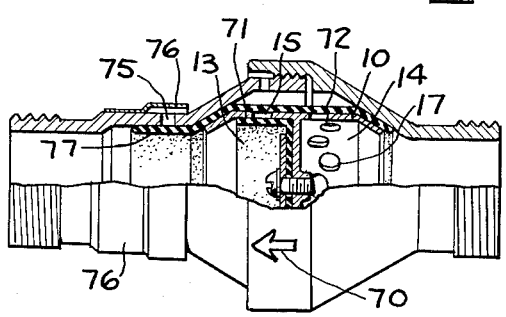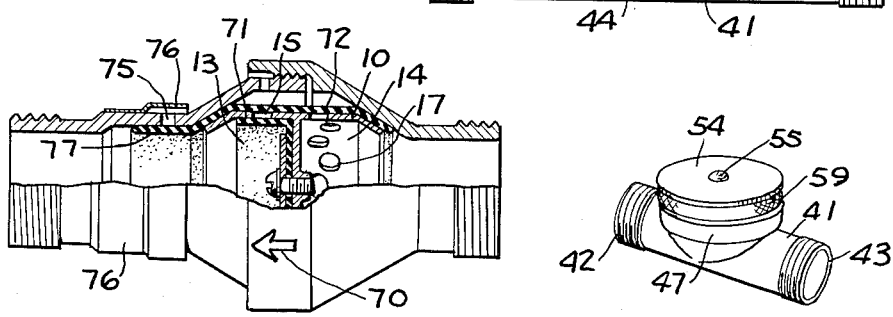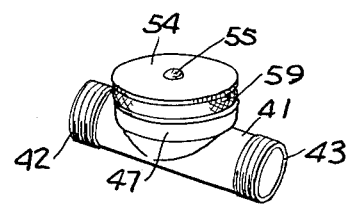

United States Patent Office 2,988,103
Patented June 13, 1961

2,988,103
DEVICE FOR PREVENTING BACK SYPHONING
IN WATER PIPES
Darwin Canvasser, 26515 Dundee,
Huntington Woods, Mich.
Filed Sept. 30, 1957, Ser. No. 686,965
2 Claims. (Cl. 137—218)

This invention relates to valves controlling flow of fluids, and more particularly to an improved valve intended particularly, but not exclusively, for use in plumbing installations for preventing the flow of discharged water back into the water system, a condition sometimes referred to as "back syphoning." The present application is a continuation-in-part of my co-pending application executed by me on August 13, 1957, and filed August 26, 1957, Serial No. 680,104, now abandoned.

The great usefulness and, in fact, necessity of devices of such nature in plumbing installations have been realized by those skilled in the art for many years. In fact, various building codes and ordinances require the use of such devices in plumbing installations since it has been found that under many conditions sub-atmospheric pressure, which may develop in the supply water pipes, causes suction of polluted water from lavoratories, toilet bowls, washing machines and the like. Serious epidemics have been traced to occurrences of this nature.

As a result of such realization, there have been developed and are now commercially available numerous devices usually referred to as back flow preventors and/or atmospheric vacuum breakers intended to prevent "back flow" or "back syphoning" in plumbing installations. Generally, such devices seek to perform one or more of the following functions: first, to close the supply water line when suction develops therein; second, to close by additional means the discharge line when reverse flow tends to develop therein; and, third, to admit atmospheric pressure into the discharge line which may be filled with polluted water and thus cause the column of such water, if raised above its final discharge point, to drop down and thus create an air gap between the supply line and the discharge line. Many of the devices now on the market perform only one or two of the above functions, although there are devices seeking to perform all three of them.

While prior devices of the above general nature operate satisfactorily under many conditions, they, nevertheless, possess a number of serious disadvantages to the elimination of which much inventive effort has been directed over quite a number of years. One of the most serious disadvantages of the prior devices has been leakage occurring through such devices at low pressures. Such leakage has been generally due to the fact that various check valves, particularly in the form of rubber flaps and the like, are dependent for their sealing upon the existence of sufficient pressure in the line. When high pressure exists in the water line, sealing of such valve may be effective. However, when the pressure drops, leakage almost invariably develops. As a result, such devices have to be installed on the discharge side of the last faucet, i.e. at a place in the line where there is no water and where no superatmospheric pressure exists. Moreover, many of the prior devices are operative only in an upright position and are not suitable for installation in a horizontal or inclined position, or in an upside down position. In addition, with many of the prior devices using check valves, when a piece of foreign matter lodges itself in the valve seat, leakage in the valve presents the possibility of back-syphoning, making such devices not fully reliable.

One of the objects of the present invention is to provide an improved valve for a passage of fluids, particularly liquids, therethrough and intended particularly, but not exclusively, for use in plumbing installations, whereby the above difficulties and disadvantages are greatly decreased and virtually eliminated, and there is provided a leak-proof valve unaffected by pieces of foreign matter that may tend to lodge themselves within the device, and the operation of which is not affected by fluctuations of pressure in the line.

Another object of the present invention is to provide an improved valve of the above general nature which is effective irrespective of its position in the installation, i.e. which operates successfully in vertical, horizontal, inclined, upside down or any other position.

A further object of the present invention is to provide a valve of the above general nature in which the water passing therethrough is positively sealed, affording no possibilities of leakage and making the device advantageous and dependable when installed on the discharge side of the faucet as well as on the supply, i.e. high pressure side, thereof.

A still further object of the present invention is to provide a device of the above general nature which may be installed in a straight pipe as well as at the place of juncture of two pipes meeting at an angle.

A still further object of the present invention is to provide an anti-syphoning valve having a double check valve operation, i.e. effective to close both the supply line as well as the discharge line by two separate valves located within the device.

A still further object of the present invention is to provide a valve of the above general nature, affording possibilities of easy incorporation of a skirted vacuum breaking valve, particularly for installation on the discharge side of a faucet.

Further objects and advantages of this invention will be apparent from the following description and appended claims, reference being had to the accompanying drawings forming a part of this specification, wherein like reference characters designate corresponding parts in the several views.

FIG. 5 is a view similar in part to FIGS. 3 and 4 and illustrating operation of the device to prevent the back-syphoning when sub-atmospheric pressure develops at the supply side of the device.

FIG. 6 is a longitudinal sectional view showing a device of modified construction and embodying the present invention.

FIG. 7 is a perspective view of the device of FIG. 6.

FIGS. 8 and 9 are longitudinal sectional views showing further modifications.

FIG. 10 is a fragmentary sectional view showing a modified construction of the skirted section of the casing.

Figure 1:
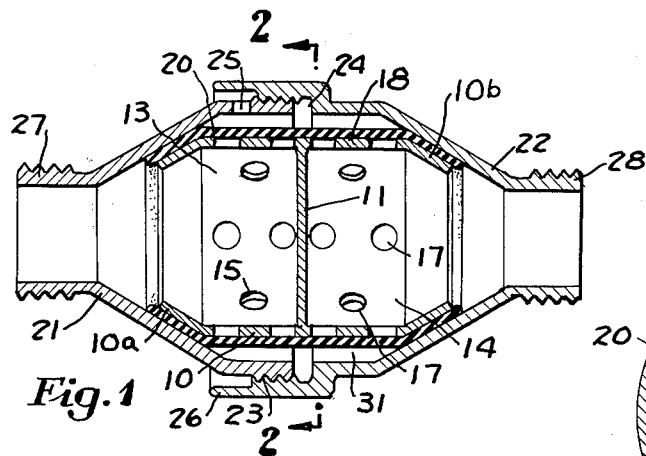
FIG. 1 is a longitudinal sectional view illustrating my improved valve in its free condition, i.e. taken by itself and without being connected to a water supply line on either of its sides.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I discard the use of valves which in operation establish a connection between the interior of the water pipes and the atmosphere. In accordance with the invention my improved device is so constructed that the water passing through it is positively sealed therein and operation of the valve does not affect the seal. I attain such construction by providing within the device two separated chambers, one connectable to the supply water pipe and one connectable to the discharge side thereof. Such chambers have no direct communication with each other but have conduits leading from each chamber to a surface covered by a resilient membrane made preferably of rubber and positively sealed around the edges of such surface. When pressure occurs on any side of the device, the rubber membrane is expanded away from the surface and provides a chamber thereat forming a communication between the two chambers and permitting through flow of fluid. Means are provided to limit expansion of the rubber member to a predetermined degree. The side of the rubber membrane opposite to its surface contacting side is open to the atmosphere. Therefore, should suction develop in the supply line, the atmospheric pressure will cause the rubber membrane to collapse on the surface and to seal the supply line and thus prevent any back flow thereinto. Such a device affords no opportunity for leakage and is operable in any position. Moreover, if reversibility of the device may be dispensed with under requirements of a particular application, my device lends itself very easily to the provision of a double check valve closing also the discharge line. Such valve may be in the form of a rubber skirted valve. Finally, in applications where my improved device is intended to be installed on the discharge side of the valve, it may easily be modified to provide an air vent and a valve normally closed but opening the vent when sub-atmospheric pressure occurs in the discharge line, thus "breaking the vacuum" in the discharge line and creating an air gap therein.

Referring to the drawings there is shown therein, by way of example, four constructions embodying the present invention. Referring particularly to FIGS. 1–5, the device illustrated therein comprises a metal sleeve 10 having a transverse partition 11 dividing the sleeve into two chambers 13 and 14. The ends of the sleeve 10 are crimped inwardly as indicated at 10a and 10b for the purposes explained below.

A plurality of openings 15 and 17 lead from the chambers 13 and 14, respectively, to the outer cylindrical surface 18 of the sleeve 10. A rubber sleeve 20 is mounted on the sleeve 10. The ends of the sleeve 20 are sealed at the crimped ends 10a and 10b of the sleeve 10 by the casing sections 21 and 22 connected together by means of mating threaded portions as indicated at 23. Because of the provision of a clearance 24, tightening of the sections 21 and 22 presses the ends of the rubber sleeve 20 against the ends of the metal sleeve 10 and positively seals said rubber sleeve at the outer surfaces of the metal sleeve ends and at the inner surfaces of sections 21 and 22. One or more atmospheric vents, such as 25, are provided in section 21, which vents are covered by a skirt 26 formed on section 22. Externally threaded extensions 27 and 28 are provided on sections 21 and 22 for connecting the device to the ends of water pipes 29 and 30 in a manner well known in the art.

It will be noted that the walls of sections 21 and 22 at the cylindrical portion of the sleeves 10 and 20 are spaced therefrom to form an air chamber 31 for the purposes explained below.

Figure 2:
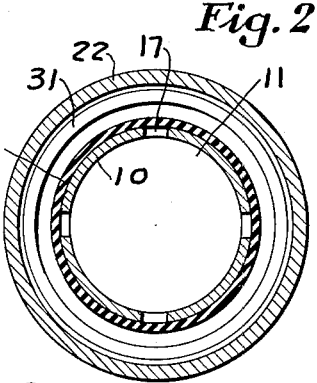
FIG. 2 is a sectional view taken in the direction of the arrows on the section plane passing through the line 2—2 of FIG. 1.
Figure 3:
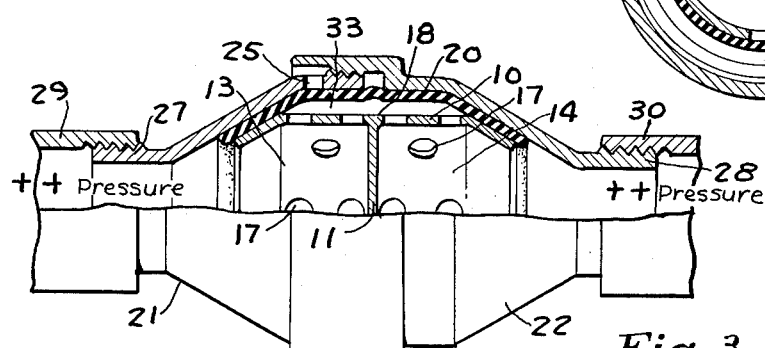
FIG. 3 is a view partly in section illustrating the device of FIG. 1 connected to a water pipe under pressure with super-atmospheric pressure existing at both sides of the device.
Figure 4:
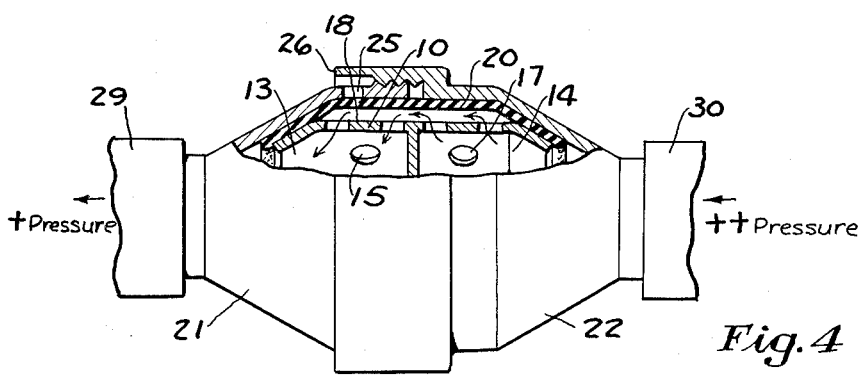
FIG. 4 is a view similar in part to FIG. 3 but showing normal flow through the device.

It will now be seen in view of the foregoing that when the device such as shown in FIGS. 1 and 2 is installed in a water line on the supply side of a faucet or a similar device, under "no flow" conditions substantially equal super-atmospheric pressures will exist at both sides of the device as is shown in FIG. 3. Under such conditions, the fluid pressure will expand the rubber sleeve 10 expelling the air from the atmospheric chamber 31 through air vents 25 until such expansion of the rubber sleeve is stopped by the walls of sections 21 and 22. There will thus be established communication between the chambers 13 and 14 through the orifices 15 and 17 and the chamber 33 formed at the surface 18 of the metal sleeve.

Should the faucet or a similar valve be opened on the lefthand side of the device, the pressure in the chamber 13 of the device will immediately drop, causing the flow of the fluid from the chamber 14 through the orifices 17, chamber 33, and orifices 15 into the chamber 13. The expanded position of the rubber sleeve 20 will not change. While providing for the flow of fluid through the device, the rubber sleeve 20 will, nevertheless, seal the water within the line positively, affording no connection through which the water from the line may escape the device under any condition.

It should be understood that the device described above is fully reversible. Should increased pressure occur in the chamber 13, the fluid will flow from chamber 13 to chamber 14 in exactly the same manner. Moreover, the operation of the device will be the same in a vertical, inclined or any other position. Such operation of the device is very important for many installations, particularly where presence of leakage cannot be allowed and where the device must be installed in a position other than an upright position, to which position operation of many prior devices is limited. Should suction develop within the supply pipe 30, see FIG. 5, sub-atmospheric pressure or vacuum will immediately develop also in the chamber 14.

It should also be appreciated that while in the prior devices presence of a particle of foreign matter at the valve seat may cause leakage and back syphoning, in my improved device, because of the large area at which the rubber membrane operates, such particle would be absorbed by the rubber mass without affecting operation of the device.

Under such conditions the rubber sleeve 20 will immediately collapse on the cylindrical surface 18 of the metal sleeve 10, closing the orifices 17 and preventing the flow of fluid from the chamber 13 to the chamber 14. The air will again enter the chamber 31 through the atmospheric vents 25. As long as suction exists in the supply pipe 30, the rubber sleeve 20 will be firmly held against the surface 18 preventing back flow or back syphoning of the fluid from the pipe 29.

FIG. 10 illustrates a modified construction of the casing section 22 operative to prevent twisting of the rubber sleeve 20 in tightening the device. In the construction of FIG. 10 the casing section 21 is identical in its construction with that of the device of FIGS. 1–5. However, the casing section corresponding to section 22 of the device of FIGS. 1–5 is divided into a casing section 35 and a tightening ring 36 having a shoulder 36a bearing on the shoulder 35a of the section 35, and a knurled section 37. With such a construction rotating the ring 36 for tightening the device and sealing the ends of the rubber sleeve 20 will not cause rotation of the section 35 and possible twisting of the rubber sleeve 20.

It should be appreciated that in the prior devices when leakage occurred thereat under normal operation, it gave no indication as to the actual condition of the respective device. In my improved device described above, leakage is an indication of a puncture or other defect in the rubber membrane or sleeve, calling for inspection of the device and perhaps replacement of the rubber membrane or sleeve. It is also of importance that such puncture or similar defect in the rubber sleeve or membrane, while giving indication of its presence by leakage, does not render the device inoperative, but, on the contrary, would operate in the case of suction developing in the supply pipe to break the vacuum by admitting air into the water line and creating an air gap therein.

FIG. 6 illustrates a modified construction of my improved device adapted for installation in a straight section of a pipe and having a straight sealing surface 40 instead of cylindrical surface 18 as in the device of FIGS. 1–5. The device of FIG. 6 comprises a body generally indicated by the numeral 41 and having ends 42 and 43 provided with threaded portions for connection to the supply and discharge pipes. A partition 44 divides the interior of the body into chambers 45 and 46. A cylindrical extension 47 is provided on the body 41 with the surface 40 forming its bottom. The surface 40 is preferably of a circular outline. A rubber membrane or diaphragm 48 sealed around the periphery of said surface 40 with the aid of a cup member 49 bears against said surface 40 to close openings 50 and 51 leading from chambers 45 and 46, respectively, to said surface 40. The bottom 52 of the cup member 49 is convex in the upward direction forming at its underside an atmospheric chamber 53 providing for limited expansion of the rubber diaphragm 48 when pressure in chambers 45 or 46 exceeds atmospheric pressure. A cover disc 54 held at the cup shape member 49 with the aid of a screw 55 is provided to shield the atmospheric vent 56. Atmospheric vents such as 57 are provided in the walls of cup-shape member 49 in places where the cover 54 bears thereat. The outer surface 59 is knurled or milled for easy rotation of the member 49. Operation of the device of FIGS. 6 and 7 is substantially similar to that of the device of FIG. 1–5 and no further description thereof is deemed necessary.

The device of FIG. 8 is similar in its construction to that of the device of FIGS. 6 and 7, the main difference being in the fact that it is adapted for installation where pipes meet at a right angle to each other. To satisfy such requirement the body 60 of the device of FIG. 8 is shaped to have its ends 61 and 62 arranged at a right angle to each other and provided with threaded portion for connection to pipes similarly arranged. A rubber membrane or diaphragm 63 is sealed against the surface 64 with the aid of a cup shape member 65 provided with atmospheric vents 66 and covered with the aid of a lid 67 held in place by screw 68. In this construction the surface 64 is part spherical producing a smoother flow of the liquid. Spanner wrench openings 69 are provided in the member 65 for rotating the same. Atmospheric openings in the form of shallow slots 60a are provided in the walls of the body 60 where the lid 67 bears thereon.

The device of FIG. 9 is a construction similar to the device of FIGS 1–5 but is a unidirectional flow device and, therefore, has to be installed for the flow in the direction indicated by the arrow 70 cast or otherwise provided on the device. This device, in addition to the elements of construction of the device of FIGS. 1–5, also includes a skirted rubber valve 71 installed within the chamber 13, which chamber in this device is always on the discharge side. If vacuum develops in the supply side chamber 14, the rubber sleeve 72 collapses on the metal sleeve 10, closing the ports 17 of the supply side chamber. At the same time, should the pressure on the discharge side exceed that on the supply side, the skirted valve 71 will then close the orifices 15 preventing the water from the discharge side chamber 13 from flowing in the reverse direction.

In addition to the above improvements, the device illustrated in FIG. 9 is also provided with atmospheric vent 75 shielded with a metal sleeve 76, but not closed thereby. The vent 75 is normally closed by the extension 77 of the rubber sleeve 72. Because of such a construction, should a sub-atmospheric pressure develop within the discharge side chamber 13, the atmospheric pressure will immediately be restored therein through the action of the valve extension 77 opening inwardly and admitting the air through the orifices 75, thus "breaking the vacuum." Should the discharge chamber 13 be elevated from the discharge point of the water in the discharge pipe, such breaking of the vacuum in said pipe will cause the column of discharge water to drop down and create an air gap providing for additional safety. Provision of the valve extension 77 invites the possibility of leakage out of the device as in prior constructions. Therefore, the device of FIG. 9 is particularly intended by me for installation on the discharge side of the faucet or similar valve device.

To decrease or even completely eliminate such leakage tendency at the port 75, I prefer to have the rubber sleeve 72 so selected with respect to its diameter that in a free condition of the device the rubber thereof is in slight tension over the cylindrical portion of the metal sleeve 10 thereof and in slight compression in the portion of such sleeve bearing on the atmospheric vents 75. Slight compression is also desired at the skirted valve 71. However, such compression should not be such as to cause tendency in the rubber to cause folds. By virtue of such expedients there will always be a slight force tending to keep the orifices over which the rubber sleeves 71 and 72 are fitted closed, and, therefore, to prevent leakage from chamber to chamber or outwardly of the device through the atmospheric vents 75, at low pressures. Under certain conditions, such operation of the portions of the sleeves 71 and 72 may be aided by metal springs preferably of stainless steel or other non-corrosive metal. Such springs may be imbedded in rubber or be arranged on the outside of the device. Rings made of helical springs may be particularly advantageous for such purpose.

Referring to FIG. 1, it will be understood that provision of atmospheric vents 25 may also be eliminated for the same purpose, and such opening may be substituted by a check valve opening inwardly. With such a construction, expansion of the rubber sleeve 20 will be taking place in opposition to the increasing air pressure in the air chamber 31 caused by expansion of the rubber sleeve. The air trapped in the air chamber will then reach substantially the same pressure as in the supply line. Thus, in case of vacuum in the supply line, air pressure in the chamber 31 will aid sealing such line to prevent back-syphoning. In addition, fluctuation of pressure in the supply line will cause movements of the rubber exercising the rubber mass and preventing its deterioration as well as preventing its permanent set or sticking to the walls of the chamber 31. Provision of a check vale to admit air into the chamber 31 in case of vacuum in the supply pipe is necessary with such a construction.

There is thus provided an improved device of the above nature whereby the objects of the present invention and numerous additional advantages are attained.

I claim:

1. A device interposable into a water pipe for preventing back syphoning therethrough, said device comprising an articulated body having an intake opening and a discharge opening provided therein, a metal sleeve having perforated cylindrical walls, a transverse partition dividing said sleeve into two end chambers, one chamber communicating with the intake opening and the other with the discharge opening, a pretensioned rubber sleeve substantially co-extensive with said metal sleeve and fitted over the outside cylindrical surface thereof and sealed at the ends of said metal sleeve, a casing provided with non-restrictive atmospheric opening and spaced from said rubber sleeve to provide room for limited expansion thereof under liquid pressure, a rubber skirt provided within said metal sleeve on the discharge side thereof to close communication between the inside and the outside surfaces of said metal cylinder on the discharge side thereof when the direction of the flow of the liquid in said device tends to change.

2. A device interposable into a water pipe for preventing back syphoning therethrough, said device comprising an articulated body having an intake opening and a discharge opening provided therein, a metal sleeve having perforated cylindrical walls, a transverse partition dividing said sleeve into two end chambers, one chamber communicating with the intake opening and the other with the discharge opening, a pretensioned rubber sleeve substantially co-extensive with said metal sleeve and fitted over the outside cylindrical surface thereof and sealed at the ends of said metal sleeve, a casing provided with non-restrictive atmospheric opening and spaced from said rubber sleeve to provide room for limited expansion thereof under liquid pressure, and a rubber skirt valve at said casing on the discharge side thereof adapted to open and admit atmospheric pressure when sub-atmospheric pressure develops on the discharge side of the device.

References Cited in the file of this patent

UNITED STATES PATENTS

| | | |
|---|---|---|
| 225,776 | Wilson | Mar. 23, 1880 |
| 1,269,721 | Kuntny | June 18, 1918 |
| 1,798,536 | Hofmann | Mar. 31, 1931 |
| 2,236,477 | Fuchs | Mar. 25, 1941 |
| 2,353,143 | Bryant | July 11, 1944 |
| 2,449,573 | White | Sept. 21, 1948 |
| 2,501,121 | Caserta | Mar. 21, 1950 |
| 2,598,002 | Langdon | May 27, 1952 |
| 2,677,390 | Davis | May 4, 1954 |
| 2,707,481 | McPherson | May 3, 1955 |
| 2,746,477 | Krause | May 22, 1956 |
| 2,818,880 | Ratelband | Jan. 7, 1958 |
| 2,877,791 | Rich | Mar. 17, 1959 |
| 2,897,835 | Philippe | Aug. 4, 1959 |
| 2,938,532 | Fraser | May 31, 1960 |

FOREIGN PATENTS

| | | |
|---|---|---|
| 15,613 | Great Britain | Nov. 27, 1884 |
| 179,538 | Germany | Dec. 7, 1906 |